United States Patent [19]

Eastty et al.

[11] Patent Number: 5,892,938
[45] Date of Patent: *Apr. 6, 1999

[54] INTERACTIVE INTERFACE SYSTEM

[75] Inventors: Peter Charles Eastty, Oxford; William Edmund Cranstoun Kentish, Chipping Norton, both of England

[73] Assignees: Sony Corporation, Tokyo, Japan; Sony United Kingdom Limited, Weybridge, England

[*] Notice: This patent issued on a continued prosecution application filed under 37 CFR 1.53(d), and is subject to the twenty year patent term provisions of 35 U.S.C. 154(a)(2).

[21] Appl. No.: 654,216

[22] Filed: May 28, 1996

[30] Foreign Application Priority Data

Jun. 26, 1995 [GB] United Kingdom .................... 9512999

[51] Int. Cl.$^6$ ........................................... H04L 12/26
[52] U.S. Cl. .................... 395/500; 395/653; 364/400.01; 345/326; 345/333
[58] Field of Search ..................................... 395/500, 611, 395/612, 613, 614, 505, 326, 329, 335, 653; 364/578, 483, 400.01; 345/326, 333

[56] References Cited

U.S. PATENT DOCUMENTS

| | | | |
|---|---|---|---|
| 5,185,599 | 2/1993 | Doornick et al. ....................... 340/747 |
| 5,301,315 | 4/1994 | Pellicano ................................. 395/600 |
| 5,301,320 | 4/1994 | McAtee et al. .......................... 395/650 |
| 5,307,456 | 4/1994 | MacKay ................................... 395/154 |
| 5,418,953 | 5/1995 | Hunt et al. ............................... 395/650 |
| 5,513,130 | 4/1996 | Redmond ................................. 364/578 |
| 5,542,040 | 7/1996 | Chang et al. ............................ 395/155 |
| 5,544,067 | 8/1996 | Rostoker et al. ........................ 364/489 |
| 5,625,407 | 4/1997 | Biggs et al. .............................. 348/16 |
| 5,627,764 | 5/1997 | Schutzman et al. ................. 364/514 R |

*Primary Examiner*—Kevin J. Teska
*Assistant Examiner*—Thai Phan
*Attorney, Agent, or Firm*—Frommer Lawrence & Haug, LLP.

[57] ABSTRACT

An interactive system for interfacing with signal processing apparatus having a network of interconnected processors (e.g., for a digital audio mixing console) uses a graphical user interface for monitoring the operation of the system. The graphical user interface can be used for inputting control and/or data signals at selected points in said data processing structure and/or for displaying control and/or data signals from selected points in said data processing structure in real time. A graphical representation of an audio mixing console can be used for experimentation, set-up and training purposes.

15 Claims, 7 Drawing Sheets

INTERACTIVE INTERFACE SYSTEM

BACKGROUND OF THE INVENTION

1. Field of the Invention

This invention relates to an interactive interface system. The invention finds particular application for interfacing with audio signal processing apparatus, for example, in the form of an audio mixing console.

2. Description of the Prior Art

Traditionally, audio mixing consoles have been based on discrete technology with audio signal processing modules connected together in a desired relationship and then controlled by manually operable switches on the console. It has been a relatively straightforward task, albeit a skilled and time consuming task, to oversee the physical interconnections necessary during setting up and debugging a desired audio processing structure. However, traditional audio mixing consoles have a number of disadvantages including their physical size, the total number manually operable controls (fader, potentiometers, switches, etc.), and the relative inflexibility of the overall arrangement.

Accordingly, it has been proposed to provide an audio mixing console comprising a front panel including a plurality of user operable controls for controlling different audio signal processing functions and a digital signal processor for processing audio signals in response to the settings of the user operable controls. It is hoped that such technology can lead to reductions in the overall size of such consoles while at the same time increasing flexibility. However, a disadvantage of such technology is the removal of direct physical relationship between the actual audio functions and interconnections of the mixing console and the processing of those functions. As a result of this, the setting up and debugging of a desired audio processing structure becomes an virtually impossible task, especially as in practice the operator of the console will wish to try out different combinations and orders of mixing operations before and/or during the processing of real time audio signals for broadcast, recording, or other purposes.

SUMMARY OF THE INVENTION

In accordance with the invention therefore, there is provided an interactive system for interfacing with signal processing apparatus having means for inputting and outputting signals, a network of interconnected processors and means for defining a reconfigurable data processing structure on the network for digitally processing input signals in real time to generate output signals, the interactive system comprising a graphical user interface (GUI) for user interaction with the data processing structure for inputting control and/or data signals at selected points in the data processing structure and/or for displaying control and/or data signals from selected points in the data processing structure in real time.

By providing a GUI for user interaction with the data processing structure for inputting control and/or data signals at selected points in the data processing structure and/or for displaying control and/or data signals from selected points in the data processing structure in real time, it is possible to monitor and debug a data processing structure for execution on the network during run-time operation of the data processing structure.

A GUI representation of the data processing structure can be readily interpreted by a user and facilitates the setting up, monitoring and debugging of the data processing structure.

The user can readily identify locations at which signal values should be input or output. A data processing structure can be interrogated without actually needing manually to make physical connections. The modification or tailoring of an existing design to particular requirements is also facilitated.

Preferably, the graphical user interface comprises a navigation controller for displaying a graphical representation of the data processing structure and for navigating through the graphical representation of the data processing structure. This permits a user rapidly and easily to identify a point of interest in the data processing structure, particularly where a windowing system is used for displaying the graphical representation. The system preferably comprises user operated input devices for identifying and selecting nodes in the graphical representation of the data processing structure.

The navigation controller is preferably responsive to data defining the data processing structure for determining a processor of the network at which parameters for a selected node are processed. The data can be stored in a suitable data structure.

A preferred embodiment of the invention is intended for signal processing apparatus having a network including one or more control processors and a plurality of signal processors connected to the control processor(s) and a data processing structure comprising means defining a control processing structure and a signal processing structure. In this case the navigation controller is responsive to selection of a control node to start control processing operations by a control side controller and is responsive to selection of a data node to start signal processing operations by a signal side controller.

The control side controller is responsive to the navigation controller to cause control signals from the control processing structure for a selected node to be displayed in response to user selection of a read operation and to cause control signals to be written to the control processing structure for a selected node in response to user selection of a write operation. The control side controller provides a graphical and/or a numerical representation of one or more control variables and/or an interactive graphical representation of one or more user input devices for representing input device position(s).

The signal side controller is responsive to the navigation controller to cause a signal trace for a sequence of signals read from the signal processing structure for a selected node to be displayed in response to user selection of a read operation and to cause a sequence of signal values representative of a signal trace to be written to the signal processing structure for a selected node in response to user selection of a write operation. A buffer for storing the sequence of signals read from the signal processing structure and a buffer for the sequence of signals to be written to the signal processing structure are provided.

In an embodiment of the invention wherein the network comprises a plurality of synchronously operating signal processors each signal processor synchronously cycles through a predetermined number of instruction steps in respective instruction cycles, the navigation controller is responsive to data defining the data processing structure for determining a signal processor of the processor network for a selected node, for enabling a signal input/output for that processor and for determining a processor cycle timing for the selected node, for writing or reading a sequence of signals to or from the signal processor.

In a particular embodiment of the invention, the data processing structure is an audio signal processing structure for an audio mixing console.

The invention also provides an interactive interface system comprising a panel emulator defining an interactive graphical user interface representation of the front panel of an audio mixing console including at least one user input device, the panel emulator simulating the functionality of the user input device(s). The panel emulator can be used for experimentation, set up and training purposes.

Preferably the panel emulator comprises means for providing a graphical user interface representation of a selected part of the front panel to assist in the control of the emulation of a complex panel.

The invention provides the combination of an interactive interface system as defined above and an audio mixing console.

The invention further provides a combination of an interactive interface system as defined above and signal processing apparatus having means for inputting and outputting signals, a network of interconnected processors and means for defining a reconfigurable data processing structure on the network for digitally processing input signals in real time to generate output, signals.

As indicated above, the invention finds particular application to audio processing, more particularly for, or in connection with an audio mixing console, wherein the network comprises a digital signal processing network of an audio mixing console and the data structure comprises a digital audio processing structure of the audio console. Here the interactive interface can be used to insert at and/or output from selected points in the signal processing structure digital audio signals (e.g., audio signals being or to be processed) and/or control signal values (e.g., control values for a fader or switch).

It will be appreciated that although the invention finds particular application to the processing of audio signals in the context of an audio signal mixing console, the invention also finds application to other data processing networks where a data processing structure is to be implemented on the network.

BRIEF DESCRIPTION OF THE DRAWINGS

An embodiment of the invention will be described by way of example only with reference to the accompanying drawings in which.

DESCRIPTION OF THE PREFERRED EMBODIMENTS

Figure 1:
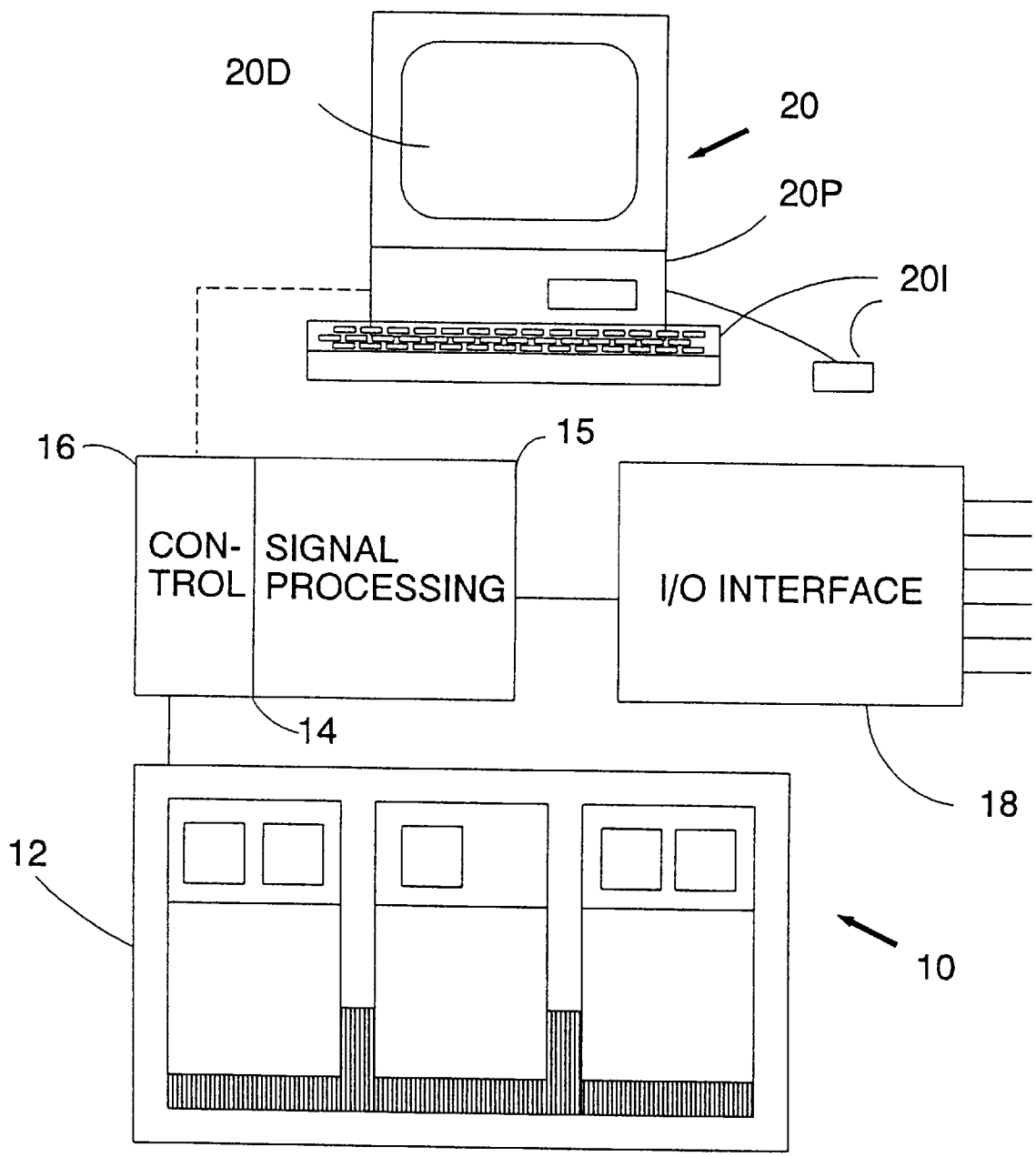
FIG. 1 is a schematic block diagram of a mixing console for audio signal processing.

FIG. 1 represents a simplified schematic block diagram of a mixing console 10 for use in an audio recording studio. The console 10 comprises a front panel 12, a processor network 14 comprising an array of signal processors 15 and a plurality of control processors and buffer circuitry 16, and one or more input/output interface processors and interfaces 18. Also shown in FIG. 1 is a host unit 20, which could be permanently connected to the remainder of the system, or could be connected only during initialisation and debugging stages of operation.

The panel 12 comprises an array of operator controls including faders, switches, rotary controllers, video display units, lights and other indicators, as represented in a schematic manner in FIG. 1. Optionally the panel 12 can also be provided with a keyboard, tracking device(s), etc, and general purpose processor (not shown) for the input of an control of aspects of the operation of the console. One or more of the video display units on the panel can then be used as the display for the general purpose computer.

In one embodiment, the host unit 20 is implemented as a general purpose workstation incorporating a computer aided design (CAD) package and other software packages for interfacing with the other features of the mixing console. The host unit could alternatively be implemented as a purpose built workstation including special purpose processing circuitry in order to provide the desired functionality, or as a mainframe computer, or part of a computer network. As shown in FIG. 1, the control unit 20 includes a display 20D, user interface devices 20I such as a keyboard, mouse, etc., and a processing and communication unit 20P.

In normal operation, control of the mixing console is performed at the front panel, or mixing desk 12. The mixing console 10 is connected to other devices for the communication of audio and control data between the processor network 14 and various input/output devices (not shown) such as, for example, speakers, microphones, recording devices, musical instruments, etc. Operation of the studio network can be controlled at the front panel or mixing desk 12 whereby communication of data between the devices in the studio network and the implementation of the necessary processing functions is performed by the processor network 14 in response to operation of the panel controls.

The processor network 14 can be considered to be divided into a control side 16, which is responsive to the status of the various controls on the front panel 12, and an audio signal processing side 15 which implements the required audio processing functions in dependence upon the control settings and communicates audio data with the studio network via the I/O interface 18.

Figure 2:
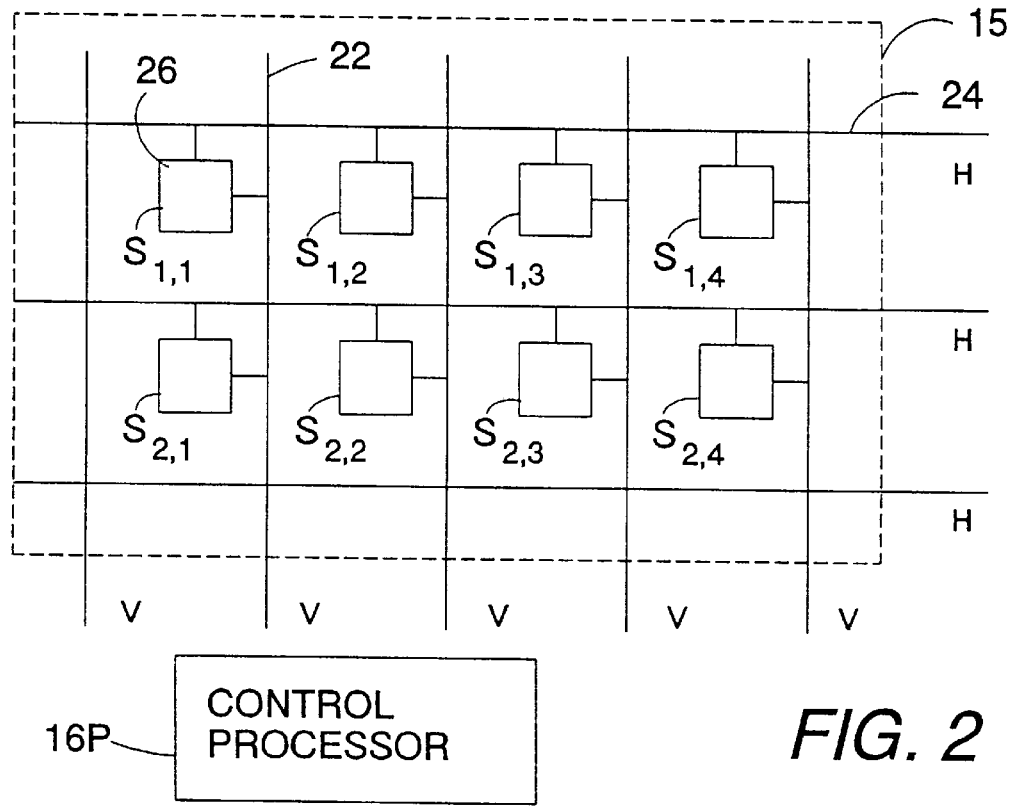
FIG. 2 is a schematic diagram of part of a signal processing network forming part of the mixing console of FIG. 1.

The processing of digital audio data is performed by a parallel signal processing array 15, part of an example of which is illustrated schematically in FIG. 2. This shows an array of 8 signal processing integrated circuits (SPICs) 26 labelled $S_{1,1}$-$S_{2,4}$. The SPICs 26 are arranged, at least from a logical point of view, as an array with each SPIC being connected to a horizontal data bus H and a vertical data bus V. Each SPIC 26 is arranged for communication of data with each of the two buses to which it is connected. As illustrated, each of the horizontal and vertical buses H, V is shared by a number of SPICs 26, but each SPIC in FIG. 2 is connected to a respective pair of buses.

The parallel processing array as a whole consists of a substantially greater number of SPICs than is shown in FIG. 2. In the preferred embodiment the processor network 14 is arranged on a rack to which is attached a plurality of cards. Each card carries an array of, for example, 25 SPICs, the horizontal and vertical buses being connected between the cards so that from a logical and electrical point of view the SPICs form one large array. The buses may be connected in a loop with periodic pipeline registers to allow by-directional communication around the loop and to extend the connectivity of the array (see FIG. 5 to be described later).

Figure 3:
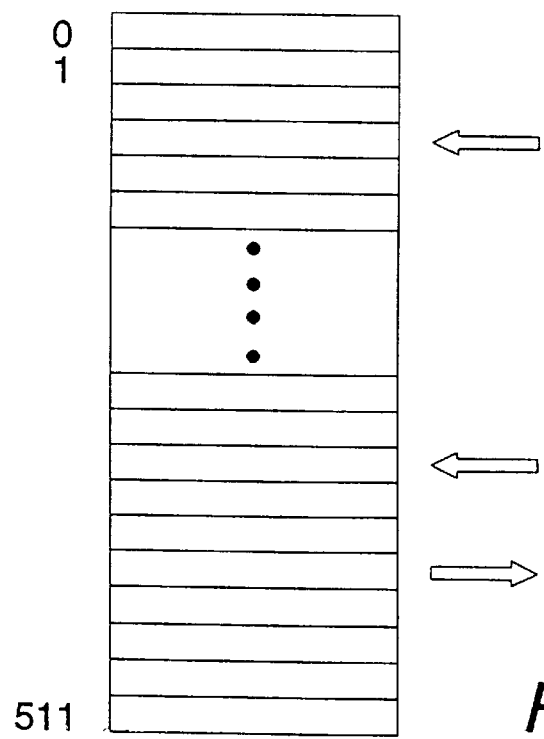
FIG. 3 is a schematic representation of a sequence of instructions performed by a signal processing integrated circuit of the signal processing network.

The SPICs 26 in the array run synchronously, each SPIC performing a sequence of instructions (e.g. 512 instructions as represented schematically in FIG. 3) in each audio sample period in accordance with an instruction sequence stored in an internal memory. The SPICs are pre-programmed with the instruction sequences at set-up so that all possible required processing operations can be implemented by the array. In operation, the SPICs run synchronously through their sequences of instructions under the control of a control processor 16P, which forms part of the control side 16 of the signal processor network 14 and is responsive to the user operation of the controls on the operator panel 12 to cause the SPICs to implement the various processing operations as required.

It will be appreciated that there is a need to control bus transfer operations between the individual SPICs. In general, all bus transfer occur at pre-arranged times (ticks) in an audio sample period and it will be appreciated that the task of setting those transfer times at the programming stage can be extremely complicated. As the array runs synchronously, only one of the SPICs connected to a given bus can output data to that bus in a given instruction cycle (or tick) of a synchronous clock. Thus, for any data transfer between SPICs and between the SPICs and I/O processes the transfer must be scheduled at a time convenient to the sending SPIC, the receiving SPIC the other SPICs connected to that bus and the I/O interface.

Figure 4:
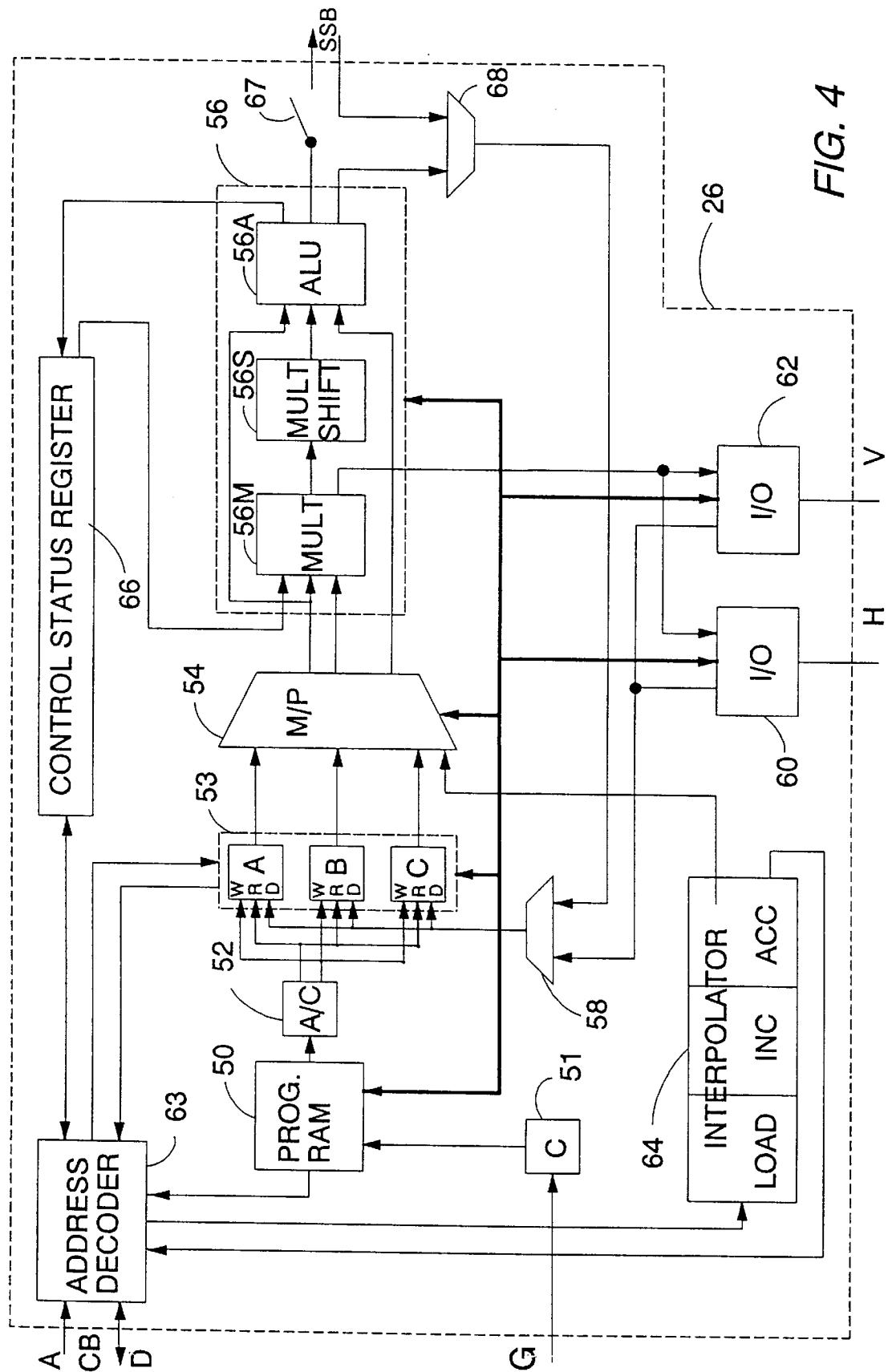
FIG. 4 is a schematic block diagram of one signal processor of the signal processing network of FIG. 2.

FIG. 4 is a simplified block diagram showing the general structure of a data processing unit or SPIC 26 which may be used in a parallel processing array as illustrated in FIG. 2.

The SPIC 26 comprises a program RAM 50 in which the instruction sequence for controlling the operation of the SPIC is stored. The program RAM 50 is connected to an address calculator 52 which generates address inputs for a data RAM 53. The data RAM 53 comprises three data RAMs 53A, 53B and 53C with respective read and write address inputs R and W and data inputs D. The three data outputs from the data RAMs 53 form three inputs to a multiplexer arrangement 54. A further input to the multiplexer 54 receives coefficients from an interpolator 64 provided separately to the processor 26 as discussed further below.

The multiplexer 54 is arranged to enable the connection of any of its inputs to any of its outputs in dependence upon the instruction being performed. The outputs of the multiplexer 54 form inputs to a data processing unit 56, which includes a multiplier (mult) 56M, a multiplier shifter (mult shift) 56S and an arithmetic and logic unit (ALU) 56A. A further output of the multiplexer 54 is connected to input and output interfaces 60 and 62 for the horizontal and vertical buses to which the SPIC is connected.

The output of the data processing unit 56 is connected, on the one hand via switch 67 to a serial signal bus SSB (to be described later) and to a multiplexer 68. The other input to the multiplexer 68 is from the serial signal bus SSB. Although shown internally to the SPIC 26, the switch 67 could alternatively be provided externally thereto.

The output of the multiplexer 68 and outputs of the I/O units 60 and 62 are connected to respective inputs of an input multiplexer 58, the output of which is connected in turn to a data input of the data RAMs 53.

In the present embodiment a single control processor 16P for all SPICs can interface with the SPIC 26 in a number of ways for the input and output of control and data values via the control bus CB and an address decoder 63. In alternative embodiments two or more control processor(s) 16 can be provided. Addresses A and data D can be supplied from the control processor 16P to the address decoder 63. From there a bidirectional connection goes to the program RAM 50 for the input and output of the control instructions for the SPIC 26. There is also a bidirectional connection via the control status register 66 for the input and output of control status data to the data processing unit 53. A further connection via the coefficient interpolator 64 enables the input of data coefficient values into the multiplexer 54.

As previously described, each SPIC 26 in the array 15 is programmed at set up time to perform a sequence of operations in each audio sample period in accordance with a sequence of instructions stored in the program RAM 50, the instructions being written to the program RAM 50 of respective SPICs 26 via the control processor(s) 16 at set up time. As shown with respect to FIG. 3, each SPIC 26 can implement 512 such instructions in respective clock periods (ticks) per audio sample period.

In operation, the 512 instructions are sequentially read out of the program RAM 50 in accordance with the clock signal from a counter 51 which generates the 512 clock cycles (ticks) per audio sample period. The counters 51 in the respective SPICs are triggered to start the tick count by a global start sample clock 'G' which runs at the audio sampling frequency. Thus, all SPICs in the array progress synchronously through their respective instruction sequences during each audio sample period.

The parallel processor network enables the implementation of all possible processing functions that may be required depending on the configuration of the studio network and the control settings at the front panel 12. To switch in or out a particular function, or to alter the routing of data, the control processor 16P can write directly to the program RAM 50 to change addresses accessed for the data RAM 53. For example, to switch in or out a given function, the address accessed by an instruction corresponding to that function can be changed from an address containing process data to be used when the function is active, to an address containing constant data to be used when the function is switched out.

The connection of the control processor 16P to the coefficient interpolator 64 is used to generate coefficients used in the processing operations of the SPICs. As panel controllers such as faders, switches, etc., are adjusted by an operator, it is necessary to vary the characteristics such as signal levels, etc., of audio signals. This can be achieved by, for example, multiplying the audio sample data by a coefficient, the value of which corresponds to the setting of a console control. Control data is therefore supplied by the control processor 26 to the interpolator 64 in dependence upon the status of the front panel controllers. However, since the sampling frequency of digital control signal supplied to the control processor 16P is generally much lower than the audio sampling frequency, for example 1 kHz for the control signals as compared with 48 kHz for the audio signals, interpolation is required to generate appropriate coefficient for the multiple audio samples within one period of the control signal sampling frequency. It is this interpolation which is performed by the coefficient interpolator 64 in dependence upon the control data from the control processor 16P. In general, coefficients are generated at half the tick rate so that each coefficient is valid for two successive ticks. The coefficient sample rate can however be adjusted if required for certain functions, such as for cross-fades. The interpolation of a coefficient takes a number of ticks for the load, increment (inc) and accumulate (acc) stages. Coefficients output by the interpolator 64 are applied to an input of the multiplexer 54.

The operation of the SPICs is highly pipelined, with the various stages of operation within the SPICs being performed in successive ticks. Thus, a period elapses between the commencement of an instruction read out of the program RAM 15 and the time by which that data is available at the output of the data processing unit 56.

It will be appreciated that the programming of the processor network including the control processors and the SPICs is a complex matter. The invention provides a user interface which permits a system engineer or an audio engineer to arrange for a particular configuration of the mixing console and/or readily vary and/or monitor parameters, data and signals during operation in an understandable manner without having to take into account the particular hardware configuration of the processing elements.

Figure 5:
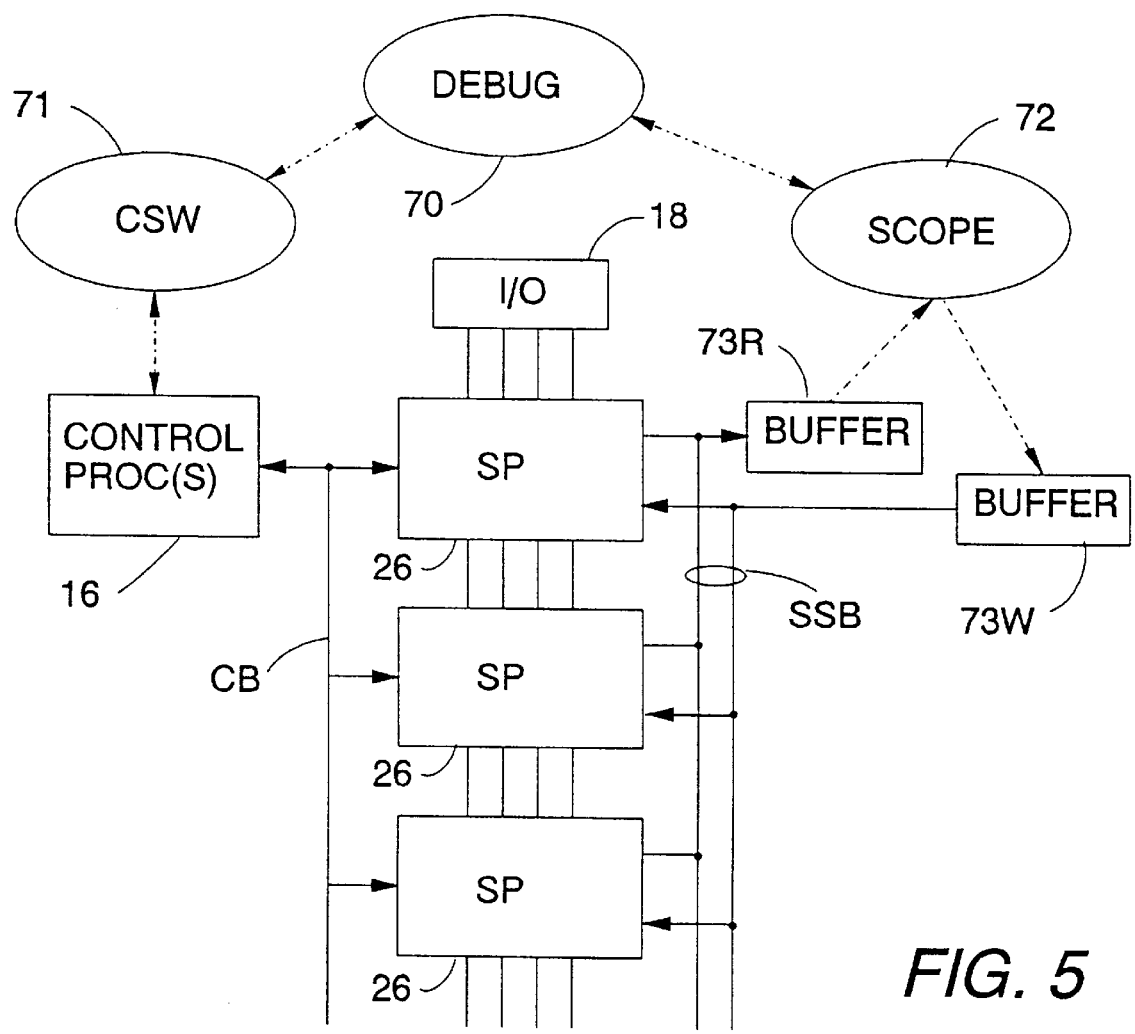
FIG. 5 is schematic representation of the interconnection of a navigation controller, at control signal controller and a data signal controller with the signal processing network of FIG. 2.

FIG. 5 is a schematic diagram illustrating the connection of tools which, in accordance with aspects of the present invention, facilitate the setting up and debugging of a signal processing structure on the signal processing network.

In particular, FIG. 5 illustrates the connection of a navigation controller (hereinafter called DEBUG) 70, control signal window controller (hereinafter called CSWC) 71 and, a signal interface controller (hereinafter called DSWC) 72. DEBUG 70 is functionally connected to CSWC 71 and DSWC 72 to invoke and control the operation of CSWC 71 and DSWC 72 and also the SPICs for turning on and off connections from the SPICs to the serial signal bus SSB. CSWC is functionally connected to the control processor(s) 16P for interfacing with the control processor(s) 16P. DSWC 72 is connected to a write buffer 73W and to a read buffer 73R for writing data to and reading data from selected SPICS via the serial signal bus SSB. It will be appreciated from the earlier description that FIG. 5 only shows three of a large number of SPICs 26.

Figure 6:
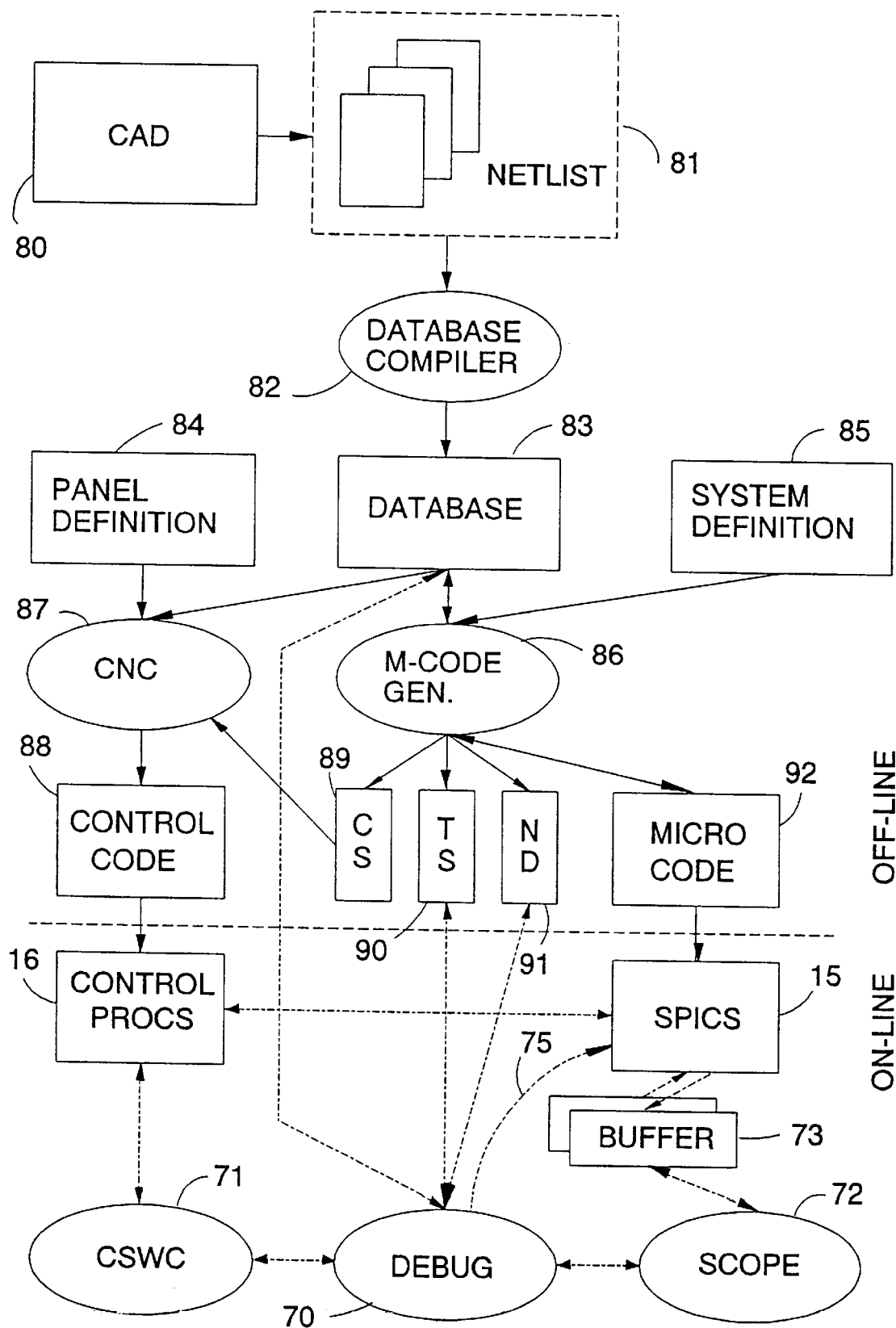
FIG. 6 is a schematic diagram of off-line and on-line logic for configuring and running the mixing console of FIG. 1.

FIG. 6 is a schematic block diagram illustrating the configuration of functional elements for programming and/or interacting with the signal processing network 15. FIG. 6 is divided into two sections.

An upper section relates to the functional elements for configuring the signal processing structure to be implemented on the processor network 14 including the control processor(s) 16P and the SPICs 26. This section is labelled "off-line" as the processes to be described with reference to the upper part of FIG. 6 can be performed, if desired, on a general purpose processor without a connection to the processor network.

A lower section relates to the operation of DEBUG 70, to invoke and control the operation of CSWC 71 and DSWC 72. This section is labelled "on-line" as these are operations typical performed at run-time connected to the processor network 14 including the control processor(s) 16P and the SPICs 26. In the present embodiment DEBUG 70, CSWC 71 and DSWC 72 are implemented in software using a general purpose processor, for example a workstation as illustrated in FIG. 1 with a graphical user interface (GUI), although it will be appreciated that a special purpose workstation involving, as appropriate, specially designed integrated circuit logic could be used for performing the functions. Also, in other embodiments, DEBUG 70, CSWC 71 and DSWC 72 could be implemented on a general purpose computer incorporated in the panel 12, as described earlier.

The user configuration can be set up using a design (e.g., a CAD) package 80 on the workstation 20 of FIG. 1. In the following description it will be assumed that this is the case. The design package 80 can be used to generate, in a conventional manner, a representation of an inter-connected network of elements. In the present case, the network of elements can comprise a network of filters, faders, switches, audio inputs, etc., part of such a network being illustrated, for example, at 94 in FIG. 8. It should be noted that in the present embodiment the network can be described in hierarchical form. Thus an element may be defined which in fact include a number of lower order elements. Also, in order to implement one element as defined, a number of lower level operations may need to be performed.

The output of the computer aided design package 80 is a netlist 81 which is stored in the memory of the workstation 20. The netlist 81 comprises a set of data files illustrating the various functional elements of the network and their interconnections.

The netlist 81 is processed by a database compiler 83 to generate a representation of the intended signal processing structure including one or more connectivity table(s) which is then stored on a database 84, for example in the memory of the workstation 20. In this manner, the standard netlist from the computer aided design package 80 can be converted into a form suitable for a particular implementation of the invention. Thus the database contains a definition of the signal processing structure including the signal inputs and outputs, control signal generators such as potentiometers, faders, etc, the processing elements and the interconnectivity of those elements. The data in the database 83 is then used by a microcode generator 86, with data relating to the hardware configuration of the console of FIG. 1 from the system definition store 85, to generate microcode 92 and also a plurality of special tables 89, 90 and 91. These tables include a coefficient map table CS 89, a ticks and SPICs table TS 90 and a network definition table ND 91. The microcode is the signal processing microcode which is loaded into the individual SPICs in the signal processing network 15 for carrying out the signal processing operations in order to implement the signal processing structure on the signal processing network 15.

The coefficient map table 89 identifies SPICs and ticks at which particular coefficients in the signal processing structure are defined. This table, in conjunction with a definition of the control panel from a control panel definition store 84 and the data in the database 83, is then used by a control network compiler 87 to generate control code 88. The control code represents the control programs which are loaded into the control processor(s) 16P for controlling the operation of the array of SPICs 26 in the signal processing network 15.

The ticks and SPICs table defines the relationship between the lowest level nodes in the signal processing structure and the SPIC which is responsible for processing a particular variable at that node and the tick within the operation of that SPIC at which the data values for that variable are to be input and/or are available within that SPIC. By "lowest level node" is meant an element of the signal processing structure description which cannot be further broken down into lower level processing elements. A lowest level node can equate to a few control instructions of the control processor(s) or a SPIC microcode instruction (e.g. add or multiply).

The network definition table ND 91 defines the interconnection of the nodes in the signal processing structure.

By means of the above, compilation of the signal processing structure on the signal processing network with the array of SPICs and control processors including programming of the individual control processor(s) 16P and SPICs 26 can be performed.

After compilation, loading of the control and signal processing code into the control processor(s) 16P and the SPICs 15 can occur at an initialisation time. Then signal processing can be performed at run-time. At run-time DEBUG 70, SCWC 71 and DSWC 72 are operable to perform diagnostic and control functions for debugging and monitoring the running system to check that the desired functional performance of the system is attained and the desired effects are produced. As illustrated in FIG. 6, DEBUG 70 interfaces with the database 83, the tick and SPIC table 90, the network definition table 91 and the SPICs 15. Also, as illustrated in FIGS. 5 and 6 DEBUG also interacts with CSWC 71 and DSWC 72. CSWC 71 interfaces with the control processor(s) 16P and DSWC 72 interfaces with the SPICs 15 via the buffers 73.

Figure 8:
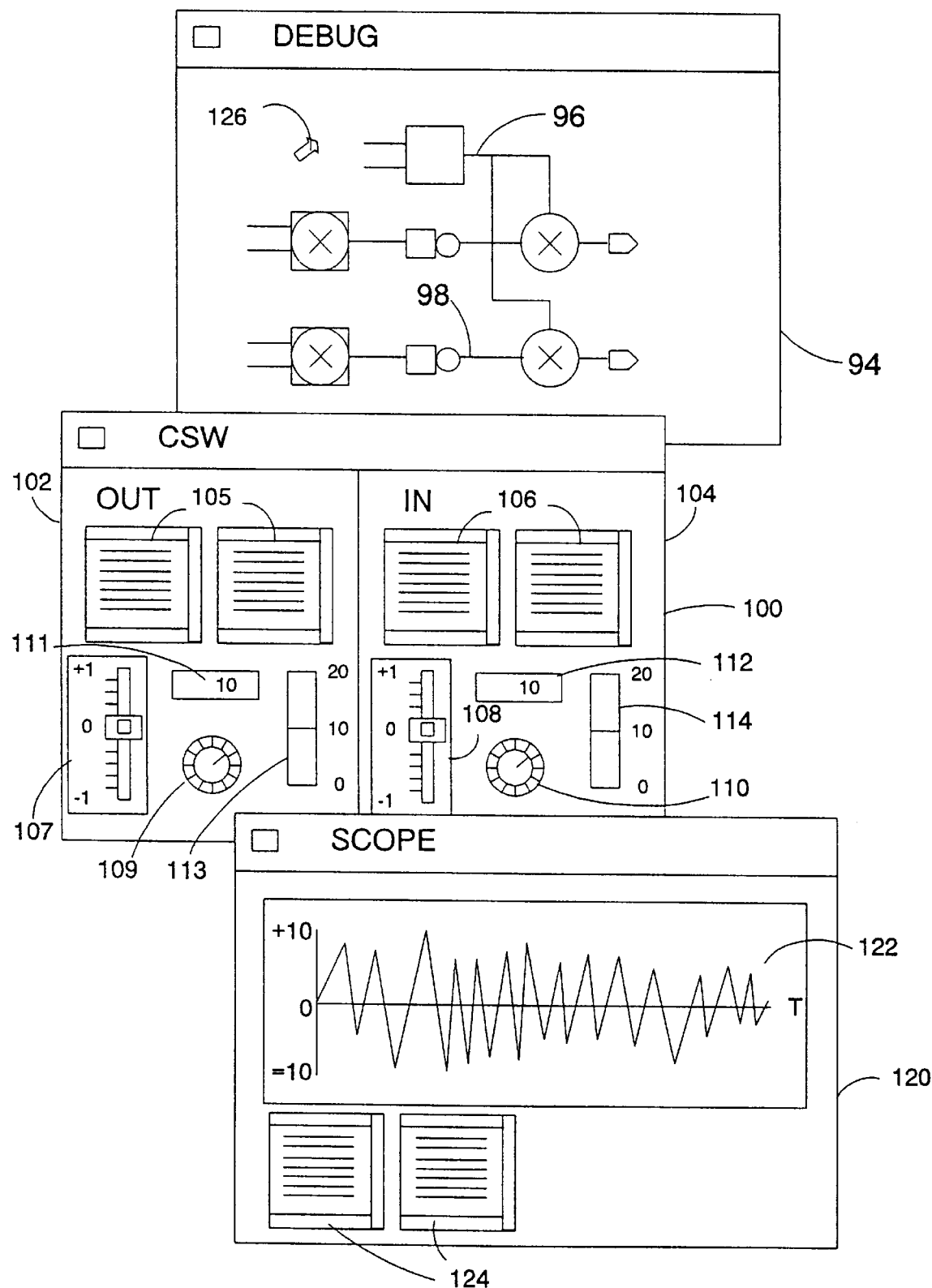
FIG. 8 is a schematic representation of navigation control signal and data signal windows.

DEBUG provides, or interacts with a graphical user interface to display a graphical representation of selected parts of the signal processing structure defined in the database 3. FIG. 8, at 94 is a schematic representation of a DEBUG window 94 showing part of a signal processing structure. The graphical representations are generated using the data from the database 83, the tick and SPIC table 90 and the network definition table 91. Using conventional user input means 126 (e.g., a mouse for controlling a screen pointer) a position or area of the displayed graphical representation can be identified and then one of a number of operations with respect to the identified position can then be selected (e.g., by clicking on an appropriate mouse button). One embodiment of the invention is configured for use with a three button mouse. Clicking a first button is used to select a lower level representation for expanding an identified element or node of the signal processing structure (or on clicking at a predetermined display position to return to a previous higher level). Clicking a second button is used to read data from an identified node and clocking a third button is used to write data to an identified node. DEBUG 70 thus provides a mechanism for navigating around the graphical representation of the signal processing structure. Where a windowing environment is employed, more than one level or view of appropriate sections of the graphical representation of the signal processing structure could be displayed at one time in a manner apparent to one skilled in the art. This facilitates the navigation process.

On clicking on the second or third buttons on the mouse for a reading or writing, respectively, DEBUG either invokes CSWC 71 where the identified node relates to a control element (e.g. 96) or invokes DSWC 72 where the identified node (e.g. 98) relates to a signal processing element. DEBUG identifies the nature of the node in question from the data in the database 83, the tick and SPIC table 90 and the network definition table 91.

CSWC provides a display 100 (preferably configured as a control signal window "CSW" in a windowing GUI environment) including a read side OUT-102 and a write side IN-104.

The read side 102 of the GUI contains one or more output fields 111, 113 for displaying one or more parameter values for a currently selected node (in graphical and/or numeric form), and output fields 107, 109 for representing the corresponding position of one or more user input devices on the panel 12 (e.g., a fader position and a control knob position). The read side can also comprise control fields 105 for displaying different parameters, ranges etc. (e.g., as one or more menus) for calibrating the output fields (e.g., on clicking on a selected parameter type and range). Optionally one or more control input fields 105 can also be used to configure the output fields to react in real time (e.g., for a predetermined period after a read operation has been selected) by clicking on the second mouse button, or to output one-off sample values corresponding to the time of clicking on the second mouse button.

The write side includes fields which are generally similar to the read side. Input fields 112, 114 can be provided for representing one or more parameter values for a currently selected node 112, 114 (in graphical and/or numeric form), as well as input fields 108, 110 for representing the position of one or more user input devices on the panel 12 (e.g., a fader position and a control knob position). Also control fields 106 can be provided for displaying and selecting different parameters, ranges etc. for setting and calibrating the input fields. The output field including the representations of the physical user input devices can be manipulated with the mouse, keyboard etc. (e.g., by pointing to and dragging the representation of the fader bar up and/or down the fader slide) to vary values to be inserted in the data processing structure. In normal operation the input values are set up before clicking on the third mouse button. The desired input (e.g., coefficient) values are then inserted into the control processor in response to clicking on the third mouse button.

DSWC 72 provides a display 120 (preferably configured as a window "SCOPE" in a windowing GUI environment) which includes a trace field 122 providing a display of a signal parameter verses time and various control fields 124 for selecting the display parameters, signal ranges and time scales for the display. The trace can be used to display and analyze a signal parameter read from a SPIC 15 over a sample period and also to input a test signal to a SPIC. The particular SPIC concerned and also the timing of the reading from or writing to the SPIC concerned via the read buffer 73R and the write buffer 73W, respectively, is controlled by DEBUG 70. In particular, the connections between the individual SPICs and the serial signal bus SSB (formed by switch 67 and multiplexer 68) is controlled by DEBUG 70. The control of the switch 67 and the multiplexer 68 in each of the SPICs can be effected in any desired manner, either by passing signals via the control bus (e.g., via the control processor(s) 16) or by means of separate control lines to the SPICs (not shown).

When reading data from the SPICs, a predetermined number of samples determined by the size of the read buffer 73R, for example corresponding to 10 seconds worth of audio signals, is written into the read buffer 73R. This can then be analyzed at leisure by selecting appropriate signal value ranges and timescales in the SCOPE window control fields. When writing data to a SPIC, a desired waveform will be set up and stored in the write buffer 73W using the SCOPE window including the control fields so as to correspond to a 10 second burst of input signals, this data then being written to the SPIC concerned.

Figure 7:
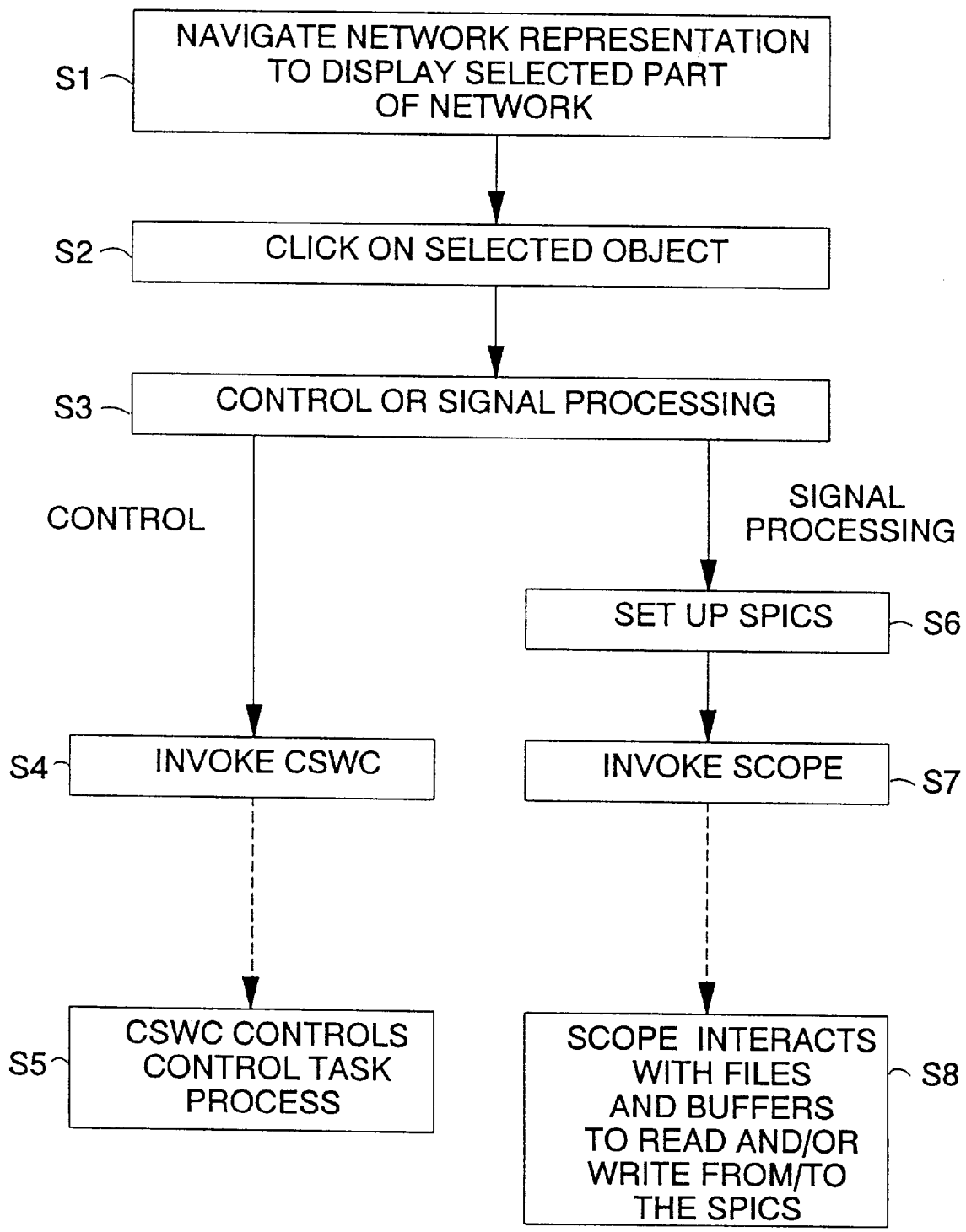
FIG. 7 is a flow diagram illustrating operations performed by the navigation and control and data signal controllers of FIG. 5.

FIG. 7 illustrates an example of operation using the functionality of the debugging controller.

In step S1, DEBUG 70 is used to navigate around the signal processing structure stored in the database 83 using the network definition in the network definition table. DEBUG 70 is arranged to interface with the graphical display facilities of the workstation 20 to display the relevant portions of the graphical representation of the signal processing structure. FIG. 8 at 94 represents a selected part of the data processing structure. This provides a user friendly mechanism to enable the user to identify an area of interest, particularly where the workstation is operating under a windowing operating system or environment as represented in FIG. 8.

In step S2, for example by using a pointing device such as a conventional mouse pointer, a user can specify a particular node (e.g., 96 or 98 in FIG. 8) within the graphical representation of the structure shown on the display screen 20D of the workstation 20.

In step S3 the DEBUG 70 responds to the clicking operation to identify whether the node in question relates to a control or a signal processing element.

If the node relates to a control processing element (e.g. 96) DEBUG 70 invokes CSWC 71 at step S4, supplying data identifying the control or coefficient values to be read from or to be written to the control processor(s) 16P.

At step S5, if a read operation is to be performed (e.g. a click on the second mouse button) CSWC 71 reads the appropriate control and/or coefficient value(s) from the control processor 16P and displays these data in the respective output fields 107, 109, 111, 113 of the CSW. If a write operation is to be performed (e.g. a click on the third mouse button) CSWC writes the appropriate control and/or coefficient value(s) to control processor as displayed in the respective input fields 108, 110, 112, 114 of the CSW.

If the node relates to a signal processing element (e.g. 98), in step S6 DEBUG 70 accesses the tick and SPIC table 90 to identify the SPIC and tick at which the appropriate data for the node identified in the graphical representation of the signal processing structure is processed in the signal processing network. It then enables the serial signal bus SSB input and output for the SPIC concerned and disables the serial signal bus inputs and outputs for the other SPICs.

DEBUG then invokes DSWC 72 in step S7.

In step S8, if a read operation is to be performed (e.g. a click on the second mouse button), data from the enabled SPIC is repeatedly read at the click rate and at appropriate tick timings in accordance with the data from the tick and SPIC table 90 into the read buffer 73R until the read buffer is full. Following this the CSWC 72 interfaces with the read buffer to display the contents of the buffer in accordance with the control parameters set in the control fields of the SCOPE window.

In step S8, if a write operation is to be performed (e.g. a click on the third mouse button), data pre-stored in the write buffer 73W by the user interacting with the SCOPE window, is repeatedly written into the enabled SPIC 26 at appropriate tick timings in accordance with the data from the tick and SPIC table 90. The values thus read into the SPIC are then processed by the signal processing network.

Thus, DEBUG 70, in combination with CSWC 71 and DSWC 72, provides a graphical user interface which can allow a user to navigate around a graphical representation of a signal processing network (e.g., an audio signal processing structure), simulate controllers or other signal generators (e.g., of the front panel of a mixing console) and provide real time interaction with the signal processing structure to monitor the operation of the signal processing structure by the display of the current values of variables read from points of interest in the structure and to inject control, coefficient and signal values at points of interest in the signal processing structure.

An embodiment of the invention also provides for the use of interactive GUI representations of the whole of or part of the front panel of a mixing console for various applications.

The interactive GUI representation provides a simulation of the front panel including the various user input devices and display elements of the real front panel. The interactive GUI representation of the various faders, control knobs etc. can be similar to that illustrated in FIG. 8 for the CSW. Preferably the interactive GUI interface allows the user to zoom into regions of the front panel to facilitate the operation of the user input control and the reading of displayed data.

Control software functionally connects the GUI representations of the user input and display elements of the simulated front panel to the real world mixing console, or alternatively to the signal processing network of the mixing console or to a subset of the signal processing network or to a software emulation thereof so that operation of the GUI interface user input devices reproduces the same effects as operation of the real world panel user input devices would.

In the first application of a GUI representation of the whole of or a part of a front panel of a mixing panel on a computer workstation, a user can experiment with potential set-ups of the audio signal processing structure. In this application the host unit could be connected to the mixing console. Alternatively, it could be connected to the data processing network, or a subset thereof, possibly with the I/O interface, or a part thereof, but without the front panel. For example it could be connected to a small signal processing rack having a sub-array of SPICs. As a further alternative it could be operated a software emulation of the signal processing network rather than with a real signal processing network. An advantage of not using the complete audio processing panel is that the experimentation can be done off-line.

Another application of a GUI representation is to allow an engineer to set up the mixing panel with a recording session configuration without using the mixing console itself. Set-up data can then be saved on, for example, a floppy disc or another storage medium and then transferred to the mixing console at the start of a recording session. Setting up a recording session configuration off-line before a recording session enables the high charges associated with the use of a professional mixing studio to be kept to a minimum.

Preferably, to assist with experimentation, the GUI panel is used in combination with the DEBUG 70. CSWC 71 and DSWC 72 described above for debugging and monitoring the operation of the experimental set-up.

In another application, the GUI interface could be used to train inexperienced engineers on the use of the mixing console without incurring the high charges associated with the use of the professional mixing console itself.

The GUI representation need not represent the full front panel, particularly if used in a training environment where the basic operation of the mixing console can be taught with a sub-set of the functionality of the full panel and where the GUI representation is implemented on lower cost hardware (e.g., a personal computer) where processing power is limited.

Although particular embodiments of the invention have been described in the present application, it will be appreciated that many modifications and/or additions may be made to the particular embodiments within the spirit and scope of the present invention.

We claim:

1. An interactive system for interfacing with a signal processing apparatus having a number of user selectable nodes comprising:

a network of processors, means for defining a reconfigurable data processing structure on said network of processors to digitally process input signals in real time and to generate output signals therefrom, a graphical user interface for user interaction with said defined reconfigurable data processing structure, said graphical user interface having a navigation controller for navigating to display a graphical representation of said defined reconfigurable data processing structure, and means for identifying whether a user selected node relates to a control processing structure or a signal processing structure.

2. The interactive system according to claim 1, wherein said graphical user interface is for user selection with said defined reconfigurable data processing structure for inputting signals at user selected points to display in real time control signals and/or data signals of said inputted signals.

3. The interactive system according to claim 2, further comprising:

user input devices for selecting nodes in said graphical representation of said defined reconfigurable data processing structure.

4. The interactive system according to claim 3, wherein said navigation controller responds to data generated by said means for defining said reconfigurable data processing structure to determine a processor of said defined data processing structure for which selected nodes are to be processed.

5. The interactive system according to claim 1, further comprising means for defining a control processing structure and a signal processing structure wherein said navigation controller responds to selecting a control mode to start control processing operations by a controller side controller and responds to selecting a data mode to start signal processing operations by a signal side controller.

6. The interactive system according to claim 5, wherein said control side controller responds to said navigation controller causing control signals from said control processing structure for a selected node to be displayed in response to user selection of a read operation and causing control signals to be written to said control processing structure for a selected node in response to user selection of a write operation.

7. The interactive system according to claim 6, wherein said control side controller provides a graphical and/or numerical representation of one or more control variables.

8. The interactive system according to claim 6, wherein said control side controller provides an interactive graphical representation of one or more user input devices.

9. The interactive system according to claim 6, wherein said signal side controller responds to said navigation controller causing a signal trace for a sequence of signals to be read from said signal processing structure for a selected node and to be displayed in response to user selection of a read operation and causing a sequence of signal values representative of a signal trace to be written to said signal processing structure for a selected node in response to user selection of a write operation.

10. The interactive system according to claim 9, further comprising a buffer for storing a sequence of signals read from said signal processing structure and for storing a sequence of signals to be read to said signal processing structure.

11. The interactive system according to claim 10, wherein said network comprises a plurality of synchronously operating signal processors, each signal processor cycles through a predetermined number of instruction steps in respective instruction cycles, said navigation controller responds to data defining said data processing structure for determining a signal processor of said processor network for a selected node, for enabling a signal to be input and output for that processor, and for determining a processor cycle timing for said selected node for writing or reading said sequence of signals to and from said signal processor.

12. The interactive system according to claim 1, wherein said data processing structure is an audio signal processing structure for an audio mixing console.

13. The interactive system according to claim 1, comprising a panel emulator defining an interactive graphical user interface representative of a front panel of an audio mixing console including at least one user input device, said panel emulator simulating the functionality of said user input devices.

14. The interactive system according to claim 13, wherein said panel emulator comprises means for providing a graphical user interface representative of a selected part of said front panel.

15. The interactive system according to claim 1, including a signal processing system having means for inputting and outputting signals, a network of interconnected processors and means for defining a reconfigurable data processing structure on said network for digitally processing input signals in real time to generate output signals therefrom.

* * * * *